United States Patent [19]

Ezaki

[11] Patent Number: 4,922,331
[45] Date of Patent: May 1, 1990

[54] COLOR VIDEO SIGNAL REPRODUCING APPARATUS HAVING TRAP CIRCUIT AND COMB-FILTER FOR FILTERING A CHROMINANCE SIGNAL BAND OF A WIDE BAND LUMINANCE SIGNAL

[75] Inventor: Tadashi Ezaki, Kanagawa, Japan

[73] Assignee: Sony Corporation, Tokyo, Japan

[21] Appl. No.: 209,189

[22] Filed: Jun. 20, 1988

[30] Foreign Application Priority Data

Jun. 23, 1987 [JP] Japan .................. 62-156060
Nov. 18, 1987 [JP] Japan .................. 62-291284

[51] Int. Cl.$^5$ .............................................. H04N 9/79
[52] U.S. Cl. ....................................... 358/31; 358/315; 358/38
[58] Field of Search ................ 358/31, 38, 315, 39

[56] References Cited

U.S. PATENT DOCUMENTS 3,924,266 12/1975 Harwood ................. 358/38
4,748,498 5/1988 Yamanishi et al. ........ 358/36

FOREIGN PATENT DOCUMENTS 43326 12/1979 Japan .

Primary Examiner—James J. Groody
Assistant Examiner—Robert M. Bauer
Attorney, Agent, or Firm—Alvin, Sinderbrand, Curtis, Morris & Safford

[57] ABSTRACT

A video signal reproducing apparatus has a filter circuit interposed in a transmission path for a reproduced luminance signal, and the characteristic of the filter circuit desirably includes a band-eliminating characteristic and a comb-filter passband characteristic which can be selectively emphasized. When the reproduced luminance signal has a normal or relatively smaller frequency bandwidth or a relatively small line correlation component, or when the level of the reproduced carrier chrominance signal is high, the band-eliminating characteristic of the filter circuit is emphasized. The foregoing video signal reproducing apparatus is particularly suited for reproducing a color video signal that includes a wide band luminance signal, in which case the comb-filter passband characteristic of the filter circuit is selected or emphasized so as to reduce noise near the color subcarrier frequency, to avoid displacement of a reproduced picture of high definition in the vertical direction and also to avoid interference caused by the vertical non-correlation component of a color picture.

18 Claims, 14 Drawing Sheets

F I G. 11
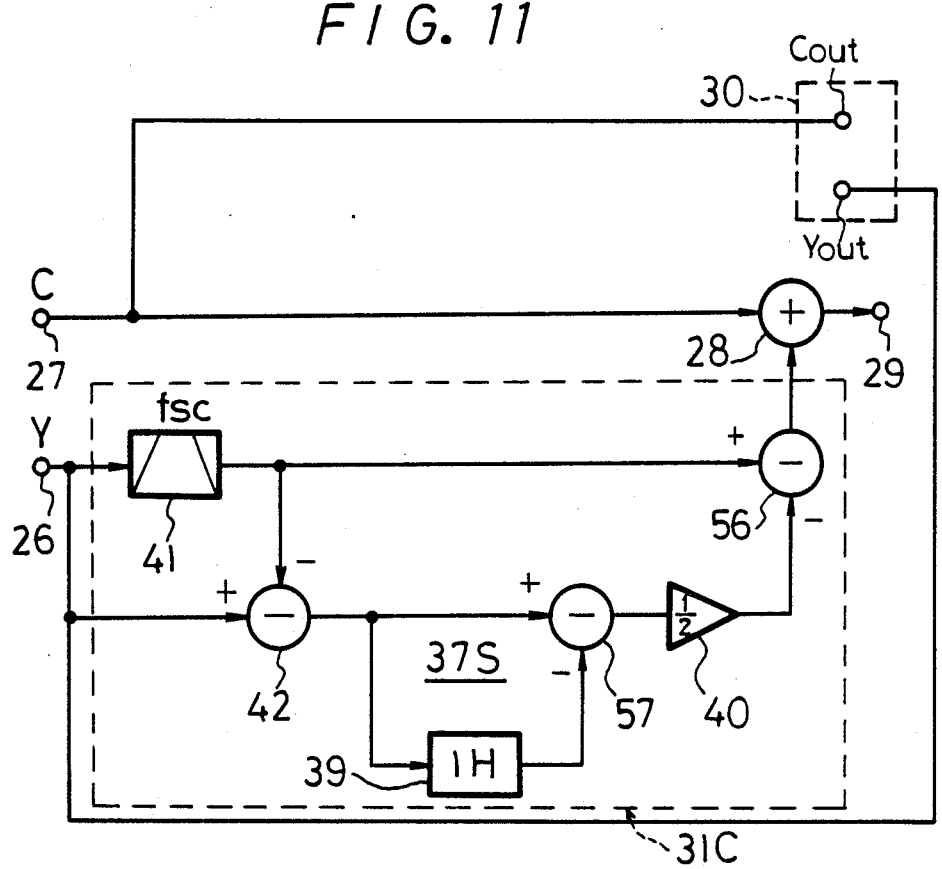
F I G. 12A
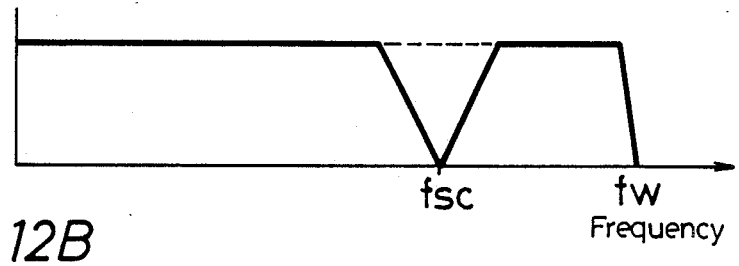
F I G. 12B
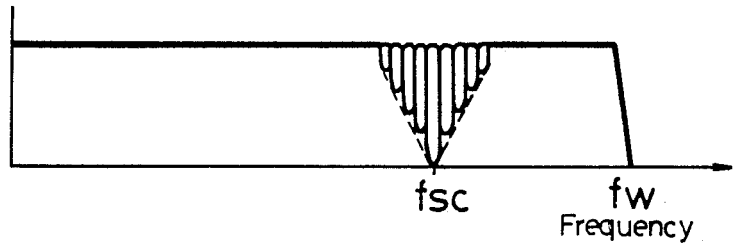

F I G. 17
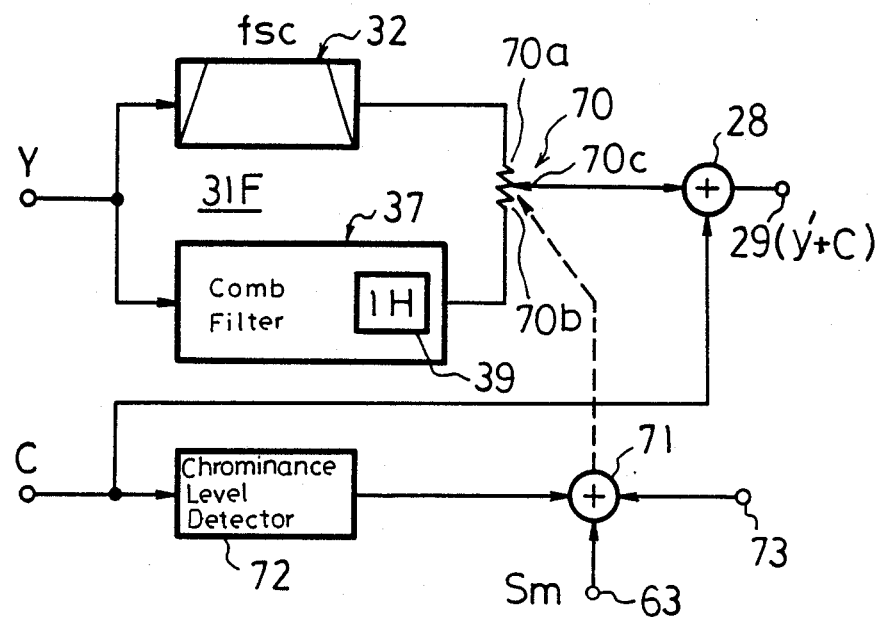
F I G. 18A
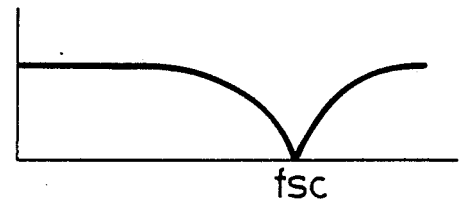
F I G. 18B
F I G. 18C

COLOR VIDEO SIGNAL REPRODUCING APPARATUS HAVING TRAP CIRCUIT AND COMB-FILTER FOR FILTERING A CHROMINANCE SIGNAL BAND OF A WIDE BAND LUMINANCE SIGNAL

BACKGROUND OF THE INVENTION

1. Field Of The Invention

This invention relates generally to a video tape recorder (VTR) and, more particularly, is directed to a color video signal reproducing apparatus having a color video signal processing circuit for reproducing a picture of high definition.

2. DESCRIPTION OF THE PRIOR ART

When a color video signal is recorded on and/or reproduced from a recording medium, such as, a magnetic tape or the like, by a conventional VTR, a luminance signal and a carrier chrominance signal are separated and then recorded on the magnetic tape in the recording system of the VTR, and the luminance signal and the carrier chrominance signal are mixed or added to each other in the reproducing system of the VTR to provide a composite color video signal. In the monitor or receiver for displaying a color picture corresponding to such color video signal, the color video signal from the VTR has to be separated again into the luminance signal and the carrier chrominance signal so that the signal processing is thereby complicated. Further, there is the risk that the quality of the color video signal will be deteriorated in the course of the repeated separation and mixing together of the luminance signal and the carrier chrominance signal.

In order to avoid the foregoing problems, it has been proposed to employ a VTR with a so-called S (super) output terminal arrangement through which the luminance signal and the carrier chrominance signal are separately provided to a monitor receiver. A reproducing system 10 of such previously proposed VTR for separately providing the reproduced luminance signal and carrier chrominance signal to an associated monitor receiver is shown on FIG. 1 to comprise a pair of rotary magnetic heads HA and HB which alternately scan a magnetic tape T for reproducing a color video signal recorded in successive slant tracks on the tape. The outputs of heads HA and HB are supplied through a playback amplifier 11 to a high-pass filter 12 and a low-pass filter 13 in which the reproduced color video signal is separated into an FM luminance signal $Y_{FM}$ and a down-converted chrominance signal $C_L$, respectively. These signals $Y_{FM}$ and $C_L$ are supplied to a luminance signal processing circuit 14 and a chrominance signal processing circuit 15, respectively. As is well known, the luminance signal processing circuit 14 includes an FM demodulator indicated schematically at 16 for providing a luminance signal Y, and the chrominance signal processing circuit 15 includes a frequency converter (not shown) by which the down-converted chrominance signal $C_L$ is re-converted to a carrier chrominance signal C having the standard carrier frequency $f_{sc}$. Further, the chrominance signal processing circuit 15 includes a delay line, as indicated schematically at 17, providing a delay of one horizontal period (1H) and forming part of a comb-filter by which a cross-talk component between adjacent tracks is cancelled. The reproduced luminance signal Y from the luminance signal processing circuit 14 is supplied through a band-eliminating filter or trap circuit 18 having a central frequency $f_{sc}$ to one inlet of an adder 19. The purpose of the trap circuit 18 is to remove from the reproduced luminance signal Y a noise component near to the carrier frequency of the reproduced carrier chrominance signal C from the processing circuit 15. Such carrier chrominance signal C from the chrominance signal processing circuit 15 is supplied to another input of the adder 19 in which it is mixed with, or added to the luminance signal Y which has had the noise component removed therefrom. The resulting composite color video signal (Y+C) is supplied from an output of the adder 19 through an amplifier 20 to an output terminal 21. The reproduced luminance signal Y from which the noise component has been removed in the trap circuit 18 is also separately supplied through an amplifier 22 to an output terminal 23, and the carrier chrominance signal C is separately provided at an output terminal 25. Such output terminals 23 and 25 constitute the previously mentioned S (super) output terminals of the reproducing system. It will be appreciated that connections may be selectively provided to a monitor receiver (not shown) from either the output terminal 21 or the output terminals 23 and 25 for thereby supplying to the monitor receiver either the composite color video signal (Y+C) or the separated luminance signal Y and carrier chrominance signal C.

In the conventional VTR, the frequency bands of the reproduced luminance signal Y and the reproduced carrier chrominance signal C are selected as shown on FIG. 2 so that the signal components thereof do not overlap each other when the signals Y and C are mixed together to form the composite signal. In such case, the horizontal resolution of the reproduced picture is, for example, about 240 horizontal lines.

Recently, in the course of the development of video technology, it has become desirable to provide a picture of higher definition from a video signal reproduced by a VTR. In order to achieve the foregoing, the carrier frequency of the FM modulator included in the recording system is made higher than that used in the prior art and, as a result thereof, the frequency band of the luminance signal Y is expanded to reach up to 5.0 to 6.0 MHz, for example, as shown in FIG. 3, thereby to provide increased horizontal resolution of the picture with, for example, 400 to 500 horizontal lines therein.

However, if the luminance signal Y has a wide frequency band so that it includes or contains the frequency band of the carrier chrominance signal C, as shown in FIG. 3, a problem arises in the conventional VTR in that the carrier chrominance signal and the corresponding frequency band of the luminance signal interfere with each other when the signals Y and C are mixed in the adder 19. For example, if a Y/C separator circuit included in the recording system of the conventional VTR utilizes a line correlation for recording and/or reproducing a color video signal, the carrier chrominance signal is mixed with the luminance signal and, therefore, the carrier chrominance signal C is reproduced both in the luminance signal system and the chrominance signal system. However, the automatic phase control (APC) is effected only in the chrominance signal reproducing system so that the phases of the carrier chrominance signals reproduced by the luminance and chrominance signal systems, respectively, do not coincide. Thus, when the luminance signal Y and the carrier chrominance signal C are added together, for example, in the adder 19 on FIG. 1, a so-called zero beat interference occurs. Further, that portion of the wide-band luminance signal Y which corresponds with the band of the carrier chrominance signal C in FIG. 3 is mixed with the carrier chrominance signal in the system for processing the latter so that an incorrect color is produced, particularly in portions of the reproduced picture having narrow slant-stripe patterns, that is, so-called cross color interference occurs.

OBJECTS AND SUMMARY OF THE INVENTION

Accordingly, it is an object of the present invention to provide a color video signal reproducing apparatus which avoids the foregoing problems encountered with the prior art.

More specifically, it is an object of the present invention to provide a color video signal reproducing apparatus which is suitable for processing a wide-band luminance signal.

It is another object of the present invention to provide a color video signal reproducing apparatus, as aforesaid, which can reduce or avoid the appearance of noise near the color subcarrier frequency.

It is a further object of the present invention to provide a color video signal reproducing apparatus, as aforesaid, which can reduce displacement of a reproduced picture of high definition in its vertical direction.

It is still a further object of the present invention to provide a color video signal reproducing apparatus, as aforesaid, which can avoid interference due to the vertical non-correlation component of a color picture.

In accordance with an aspect of this invention, a video signal reproducing apparatus for obtaining a composite color video signal from a reproduced carrier chrominance signal and a reproduced luminance signal of a frequency band containing a band of the carrier chrominance signal comprises, means defining a transmission path for the reproduced luminance signal, adding means for adding an output of the transmission path to the chrominance signal so as to provide a composite color video signal, filter means interposed in the transmission path for preventing interference between the chrominance signal and the portion of the frequency band of the reproduced luminance signal corresponding to the band of the carrier chrominance signal when the output of the transmission path is added to the chrominance signal, means for separately deriving the reproduced luminance signal from a point in its transmission path in advance of the filter means, and means for separately deriving the carrier chrominance signal in advance of the adding of the chrominance signal to the output of the transmission path.

The above, and other objects, features and advantages of the present invention will be apparent in the following detailed description of preferred embodiments which is to be read in conjunction with the accompanying drawings, and in which corresponding parts are identified by the same reference numerals in the several views.

BRIEF DESCRIPTION OF THE DRAWINGS

FIG. 11 is a block diagram similar to that of FIG. 4, but showing still another embodiment of the present invention;

FIGS. 12A and 12B are diagrams showing respective frequency spectra, and to which reference will be made in explaining the operation of the embodiment shown in FIG. 11;

FIG. 17 is a block diagram of a main portion of the reproducing system of a video tape recorder in accordance with yet another embodiment of the present invention;

FIGS. 18A–18C are diagrams showing respective frequency spectra, and to which reference will be made in explaining the operation of the embodiment of the invention shown in FIG. 17;

DETAILED DESCRIPTION OF THE PREFERRED EMBODIMENTS

Figure 4:
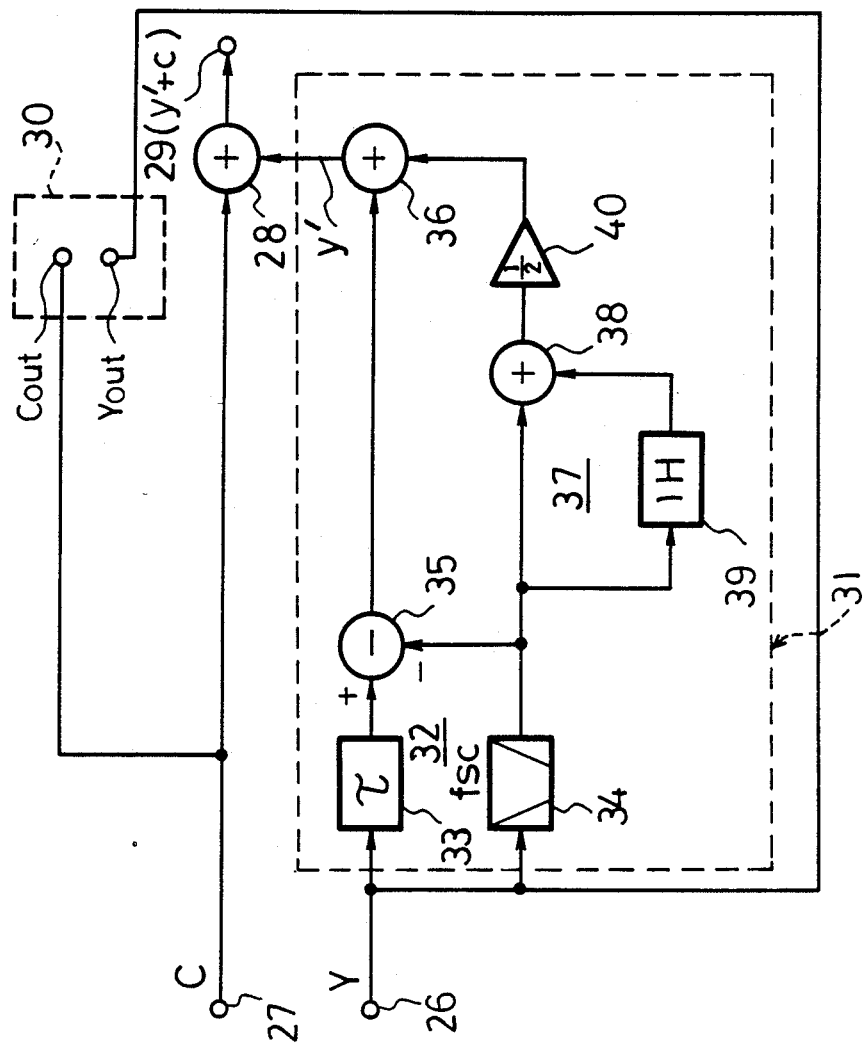
FIG. 4 is a block diagram of a main portion of a video signal reproducing apparatus according to a first embodiment of the present invention.

Referring to the drawings in detail, and initially to FIG. 4 thereof, it will be seen that, a video signal reproducing apparatus according to an embodiment of the present invention is there illustrated for obtaining a composite color video signal from a reproduced carrier chrominance signal C and a reproduced wide band luminance signal Y, that is, a luminance signal of a frequency band containing the band of the carrier chrominance signal C. Such reproduced luminance signal Y and reproduced carrier chrominance signal C, for example, having the frequency spectra illustrated on FIGS. 5A and 5B, respectively, are supplied to terminals 26 and 27, for example, from the luminance signal processing circuit 14 and the chrominance signal processing circuit 15 of the VTR shown on FIG. 1. The chrominance signal C is supplied directly from terminal 27 to one input of an adder 28 which has its output connected to an output terminal 29. Apart from the output terminal 29, there is provided a so-called S output terminal arrangement 30 which includes an output terminal $C_{out}$ connected with the input terminal 27 for separately deriving the chrominance signal C in advance of the adder 28, and an output terminal $Y_{out}$ directly connected with the terminal 26 for separately deriving the wide-band luminance signal Y.

In accordance with the present invention, a filter circuit 31 is interposed in a transmission path for the luminance signal Y between the terminal 26 and a second input of the adder 28 for preventing interference between the chrominance signal C and the portion of the frequency band of the reproduced luminance signal Y (FIG. 5A) corresponding to the band of the carrier chrominance signal C (FIG. 5B) when the output Y' of such transmission path is added to the chrominance signal C in the adder 28 for providing the composite color video signal (Y'+C) at the output terminal 29. In the embodiment of the invention shown on FIG. 4, the filter circuit 31 includes a band-eliminating filter or trap 32 which attenuates or removes from the wide-band luminance signal Y (FIG. 5A) the portion thereof corresponding to the frequency band of the chrominance signal C (FIG. 5B) and thereby provides an output having the spectrum shown on FIG. 5C. The trap 32 may include a delay line 33 and a band-pass filter 34 to both of which the wide-band luminance signal Y is supplied from the terminal 26, and a subtracter 35 which is connected to subtract the output of the band-pass filter 34 from the output of the delay line 33. The pass band of the band-pass filter 34 is selected to be substantially equal to the frequency band of the chrominance signal C, and the delay time of the delay line 33 is selected to be equal to that of the band-pass filter 34. The output of the subtracter 35, that is, the output of the trap 32, is supplied to a first input of an adder 36.

The filter circuit 31 of the embodiment of the invention shown on FIG. 4 further includes a comb-filter 37 which is of an addition type and comprises an adder 38 having a first input which directly receives the output of band-pass filter 34 and a second input which receives the output of band-pass filter 34 through a delay line 39 having a delay time equal to one horizontal period (1H) of the video signal. The output of the adder 38 is supplied to a second input of the adder 36 through a coefficient circuit or attenuator 40 in which the amplitude or level of the output of the adder 38 is reduced or attenuated by one-half.

Figure 5A:
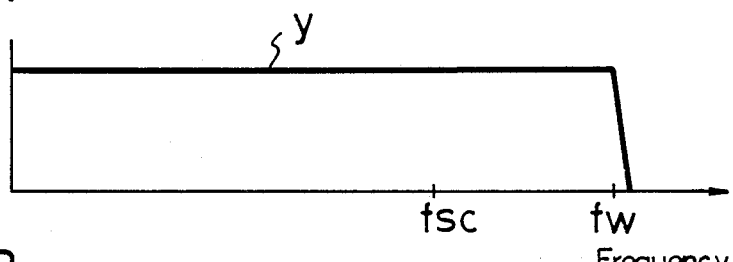
FIGS. 5A–5E are diagrams of various frequency spectra, and to which reference will be made in explaining the operation of the embodiment of the present invention shown in FIG. 4.
Figure 5B:
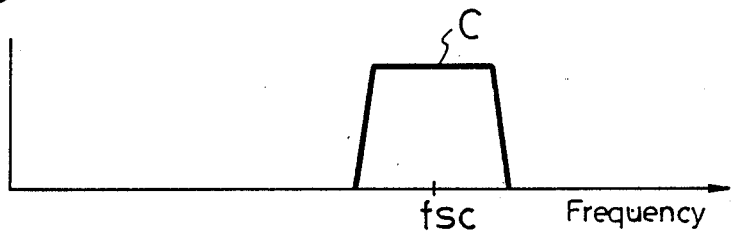

The operation of the embodiment of the present invention described above with reference to FIG. 4 is as follows:

When a luminance signal Y having a wide band extending up to a relatively high frequency $f_W$, for example of 5.0 MHz, substantially larger than the color subcarrier frequency $f_{sc}$, as in FIGS. 5A and 5B, is supplied to the terminal 26, the band-pass filter 34 separates therefrom a signal component having the same frequency band width as the carrier chrominance signal C (FIG. 5B) which, for example, has a band width of ±0.5 MHz around the color subcarrier frequency $f_{sc}$. In the subtracter 35, such separated signal component is subtracted from the wide-band input luminance signal Y (FIG. 5A) so that the output from the subtracter 35 is as shown in FIG. 5C, that is, corresponds to the spectrum of the input wide-band luminance signal Y from which that portion of the spectrum corresponding to the band width of the carrier chrominance signal C has been dropped.

Figure 5C:
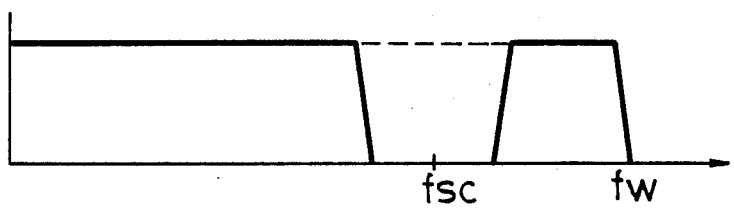
Figure 5D:
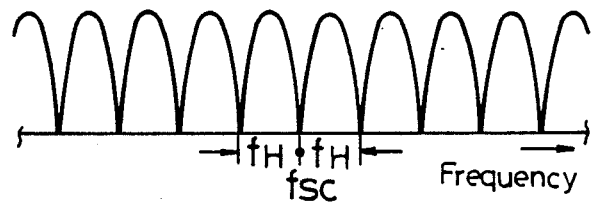

In the addition-type comb filter 37, as shown in FIG. 5D, attenuation is provided at each of the frequencies $f_{sc} \pm n \cdot f_H$, and pass bands are provided at the frequencies $f_{sc} \pm (2n-1) \cdot f_H/2$, wherein n is an integer. As is well known, in the NTSC system, the color subcarrier frequency $f_{sc}$ is selected to be an odd multiple of ½ of the horizontal scanning frequency $f_H$, so that the luminance signal Y, which has its energy concentrated near the frequencies of integral multiples of the horizontal scanning frequency $f_H$, and the carrier chrominance signal C are frequency-interleaved. With the color subcarrier frequency $f_{sc}$ being selected in accordance with the NTSC system, as described, delaying the carrier chrominance signal by one horizontal period (1H) is effective to invert the phase thereof relative to a non-delayed carrier chrominance signal with the result that the delayed and non-delayed carrier chrominance signals can cancel each other.

When the comb filter 37 having the above-described filter characteristic is supplied with that portion of the wide-band luminance signal available at the output of the band-pass filter 34, the output from the attenuator 40 has a comb-like spectrum as shown in FIG. 5D in which the frequency axis is expanded merely for the purposes of illustration. The frequency band of the envelope of the output from the attenuator 40 is limited to that shown on FIG. 5B.

Figure 5E:
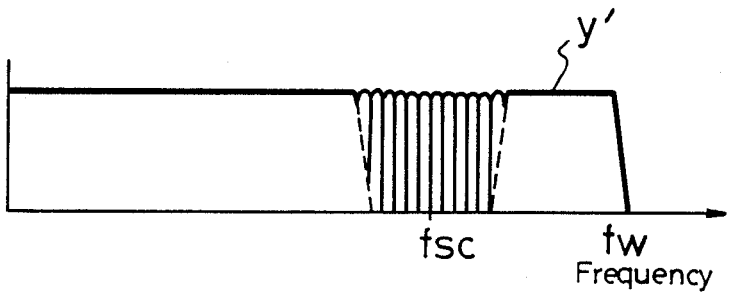

The output from the attenuator 40 having the band-limited, comb-shaped spectrum and the output from the subtracter 35 having the spectrum with a drop-out as shown in FIG. 5C are mixed or added to each other in the adder 36 so that the output Y' from the adder 36 has the spectrum shown on FIG. 5E, and in which the drop-out portion of the spectrum shown on FIG. 5C is replaced or supplemented by the band-limited, comb-shaped spectrum from the attenuator 40.

By reason of the filter circuit 31 provided in accordance with this invention, even if a chrominance signal having no line correlation component is mixed into the luminance signal Y supplied to the input terminal 26, such chrominance signal is seperated from the luminance signal by the trap 32 and is further eliminated from the output luminance signal Y' by the comb-filter 37 having the described filter characteristic. Thus, production of a zero beat interference for the non-correlation component of the chrominance signal handling system can be prevented.

Further, since the comb-filter 37 limits the expansion of the energy spectrum of that portion of the luminance signal Y having the same frequency band as the chrominance signal, even when the high band portion of the luminance signal is at a high level, cross-color interference can be suppressed.

Moreover, since the comb-filter 37 essentially passes therethrough the entire spectrum of the luminance signal Y, deterioration of the horizontal resolution of the reproduced picture is avoided.

Figure 6:
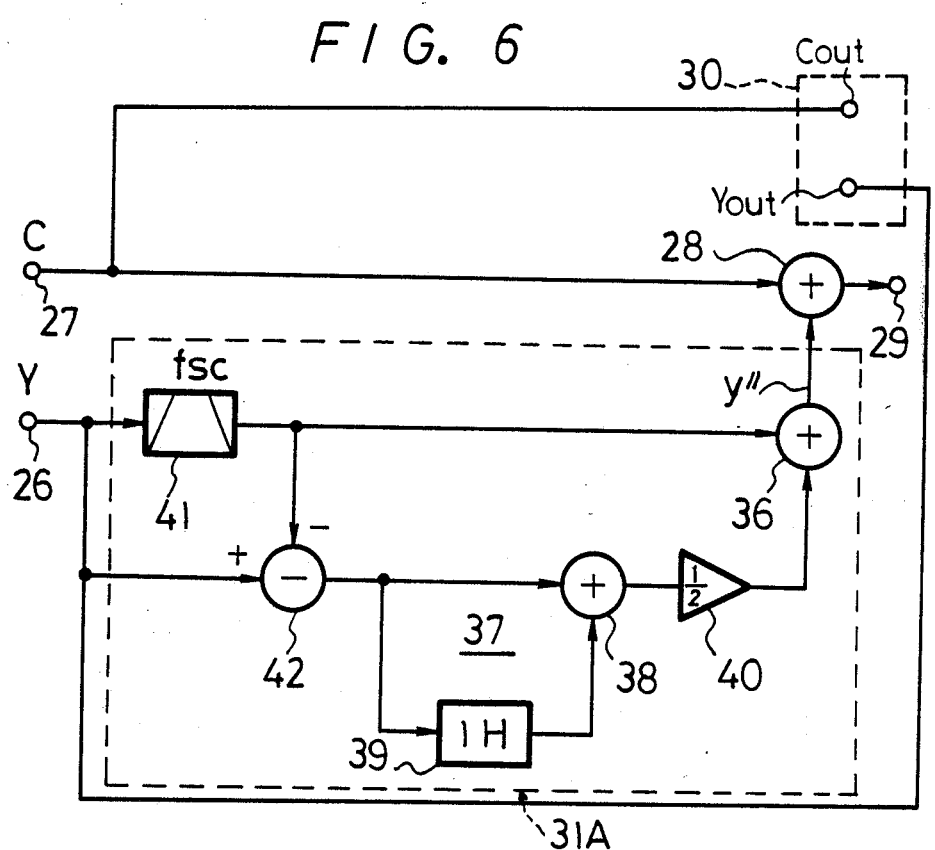
FIG. 6 is a block diagram similar to that of FIG. 4, but showing another embodiment of the present invention.
Figure 7A:
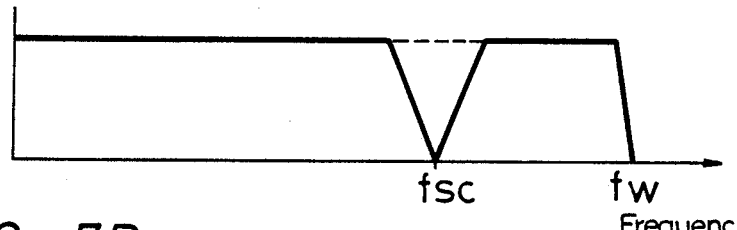
FIGS. 7A and 7B are diagrams showing respective frequency spectra, and to which reference will be made in explaining the operation of the embodiment of the present invention shown in FIG. 6.
Figure 7B:
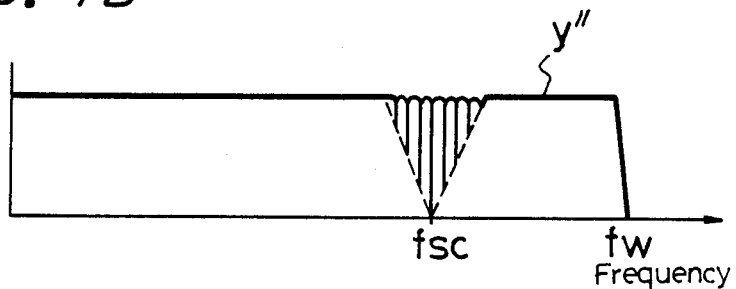

Referring now to FIG. 6 in which parts corresponding to those described above with reference to FIG. 4 are identified by the same reference numerals and will not be further described in detail, it will be seen that, in accordance with another embodiment of the invention, the reproduced luminance signal Y supplied to the input terminal 26 is applied from the latter to both a band-eliminating filter or trap 41 and one input of a subtractor 42 which, at its other input, receives the output of trap 41. The subtractor 42 subtracts the output of the trap 41 from the input or reproduced luminance signal Y. The central frequency of the trap 41 is made to be substantially equal to the color subcarrier frequency $f_{sc}$. The output from the trap 41, which has the spectrum shown on FIG. 7A, is supplied directly to one input of the adder 36, and the output of the subtractor 42, which is substantially equivalent to the portion of the spectrum dropped out or eliminated by the trap 41, is applied to the comb-filter 37. More specifically, the output of the subtractor 42 is supplied directly to one input of the adder 38 and, through the delay line 39, to the other input of the adder 38, and the resulting comb-filter output from the adder 38 is supplied through the attenuator 40 to the other input of the adder 36 so that the latter provides the luminance signal output Y'', as shown on FIG. 7B.

In operation of the embodiment described above with reference to FIG. 6, the trap 41 is effective to attenuate or eliminate from the wide-band luminance signal Y applied to the terminal 26 a signal component centered around the color subcarrier frequency $f_{sc}$ so that the output from the trap 41 has the spectrum shown on FIG. 7A in which a generally V-shaped portion is dropped-out at the color subcarrier frequency. The subtractor 42 subtracts the output of the trap 41 from the wide-band luminance signal Y applied to the terminal 26, with the result that the output (not shown) of the subtractor 42 has a generally inverted V-shaped spectrum centered about the color subcarrier frequency $f_{sc}$. Such output from the subtractor 42 is supplied to the comb-filter 37 having the frequency characteristic shown on FIG. 5D with the result that the output from the attenuator 40 has a band-limited, comb-shaped spectrum with an inverted V-shaped envelope. The adder 36 then adds or mixes such output from the attenuator 40 with the output of the trap 41 having the spectrum with a drop out, as shown on FIG. 7A, so that the output Y'' of the adder 36 is as shown on FIG. 7B, that is, the output Y'' is the wide-band luminance signal with a generally V-shaped drop out centered about the color subcarrier frequency $f_{sc}$ which is replaced or supplemented by the band-limited, comb-shaped spectrum obtained from comb-filter 37.

The embodiment described above with reference to FIG. 6 can achieve the same advantageous results as have been described for the embodiment of FIG. 4. Furthermore, since the embodiment of FIG. 6 omits the delay line 33 of the embodiment described with reference to FIG. 4, the embodiment of FIG. 6 has the further advantage of a relatively simplified circuit arrangement.

Although the attenuation band of the trap 41 is narrow, the energy spectrum of the chrominance signal is concentrated near the color subcarrier frequency $f_{sc}$ from the macroscopic standpoint, so that such narrow attenuation band is not disadvantageous.

Figure 8:
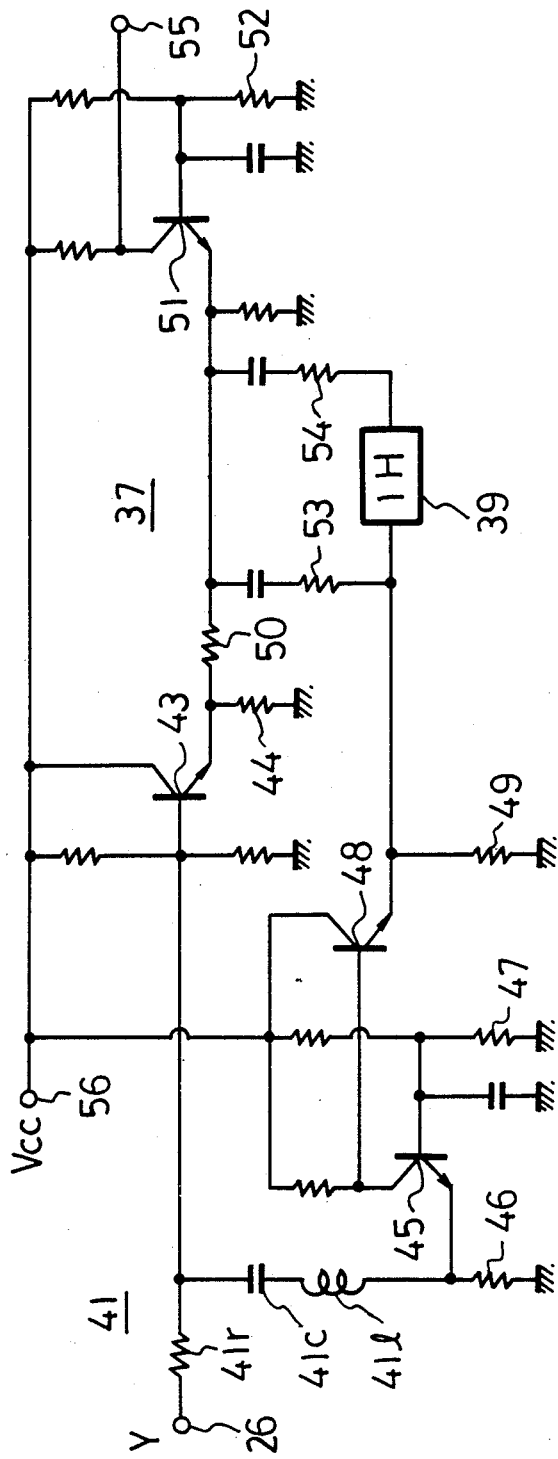
FIG. 8 is a circuit diagram illustrating a practical circuit arrangement for use in the embodiment of the present invention shown in FIG. 6.

Referring now to FIG. 8 in which parts corresponding to those described above with reference to FIG. 6 are identified by the same reference numerals, it will be seen that, in a practical circuit arrangement for the transmission path of the luminance signal in the embodiment of FIG. 6, the trap 41 includes an input resistor 41r, a capacitor 41c and a coil 41l in a series connection extending from the input terminal 26. A junction point between the resistor 41r and the capacitor 41c is connected to the base of a transistor 43 having its emitter connected to ground through a resistor 44. The wide-band luminance signal Y applied to the input terminal 26 is supplied through the resistor 41r to the base of the transistor 43, and further supplied through the capacitor 41c and the coil 41l to the emitter of a transistor 45 which has such emitter and its base connected to ground through resistors 46 and 47, respectively. The collector output of transistor 45 is applied to the base of a transistor 48 which has its emitter connected to ground through a resistor 49.

The emitter output from the transistor 43 is supplied through a resistor 50 to the emitter of a transistor 51 which has its base grounded through a resistor 52. The emitter output from the transistor 48 is supplied through a resistor 53 to the emitter of the transistor 51, and is also supplied through the 1H delay line 39 of the comb-filter 37 which may be constituted by a charge coupled device (CCD), and which has its output connected through a resistor 54 to the emitter of the transistor 51. The collector output of the transistor 51 is connected to an output terminal 55 which, in effect, corresponds to the output of the adder 36 in FIG. 6. Finally, in the circuit of FIG. 8, a voltage source providing an operating voltage $V_{cc}$ is suitably connected to a terminal 56 for providing power to the transistors 43, 45, 48 and 51.

In the circuit of FIG. 8, the series resonance frequency of the series circuit constituted by the capacitor 41c and the coil 41l is selected to be equal to the color subcarrier frequency $f_{sc}$ and the input resistance of the transistor 45 is small, so that the input to the transistor 43, and similarly the output therefrom, presents the spectrum with a portion dropped out about the color subcarrier frequency, as shown on FIG. 7A. Meanwhile, the emitter input to the transistor 45 has an inverted V-shaped spectrum centered at the color subcarrier frequency $f_{sc}$, and this spectrum is suitably amplified and then provided from the emitter of the transistor 48 with its level being equal to that of the emitter output from the transistor 43.

When resistance values $R_{50}$, $R_{53}$ and $R_{54}$ of the resistors 50, 53 and 54, respectively, are selected so as to satisfy the following relationship $$2R_{50} = R_{53} = R_{54},$$

the sum of currents supplied from the input and output sides of the 1H delay line 39 to the emitter of the transistor 51 equal to the current supplied from the transistor 43 to the emitter of the transistor 51. Thus, the emitter input to the transistor 51 has a spectrum similar to that of FIG. 7B in which the dropped-out portion of the spectrum shown in FIG. 7A is supplemented or replaced by the band-limited, comb-shaped spectrum of the comb-filter 37.

Figure 9:
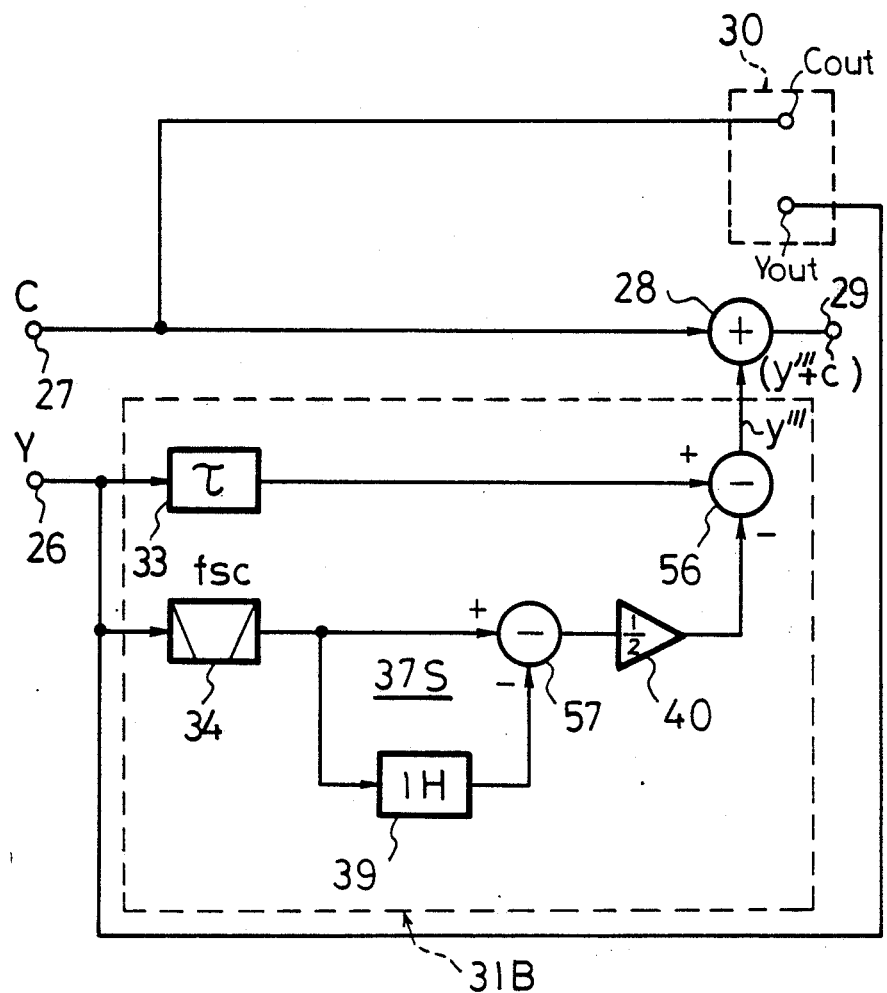
FIG. 9 is a block diagram similar to that of FIG. 4, but showing still another embodiment of the present invention.

Referring now to FIG. 9 in which parts corresponding to those described with reference to FIG. 4 are identified by the same reference numerals, it will be seen that, in an embodiment of the present invention employing a comb-filter 37S of the subtraction type instead of the comb-filter 37 of the addition type, the luminance signal Y is applied from the input terminal 26 to the delay line 33 and the band-pass filter 34, and the output from the delay line 33 is supplied to one input of a subtracter 56. Once again, the pass band of the band-pass filter 34 is selected to be equal to the frequency band of the chrominance signal C (FIG. 10B), and the delay time $\tau$ of the delay line 33 is selected to be equal to that of the band-pass filter 34.

The comb-filter 37S of the subtraction type is formed of the delay line 39 having a delay time equal to one horizontal period (1H), and a subtracter 57. The output of the band-pass filter 34 is supplied directly to one input of the subtracter 57 which, at its other input, receives the output of the band-pass filter 34 through the delay line 39. The output from the subtracter 57 is supplied to another input of the subtracter 56 through the coefficient circuit or attenuator 40 by which the level or amplitude of the output from the subtracter 57 is attenuated or reduced by one-half. Finally, the output Y''' of the subtracter 56 is supplied to one input of the adder 28 which, at its other input, receives the reproduced chrominance signal C from the respective input terminal 27. The output of the adder 28 is connected to the output terminal at which there is derived the composite color video signal (Y'''+C).

The operation of the embodiment of the invention described above with reference to FIG. 9 will now be described with reference to FIGS. 10A to 10D.

Figure 10A:
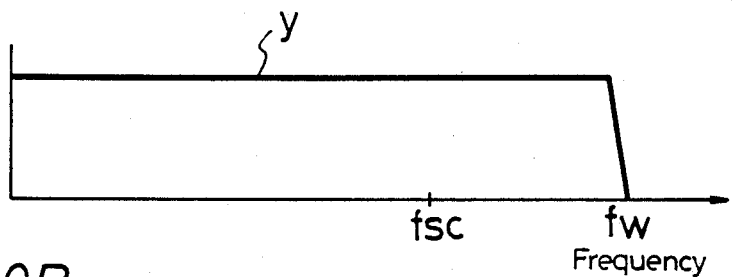
FIGS. 10A–10D are diagrams showing respective frequency spectra, and to which reference will be made in explaining the operation of the embodiment shown in FIG. 9.
Figure 10B:
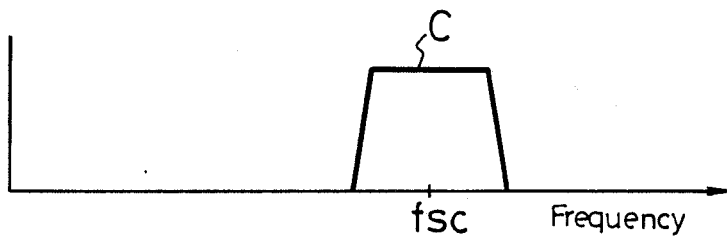
Figure 10C:
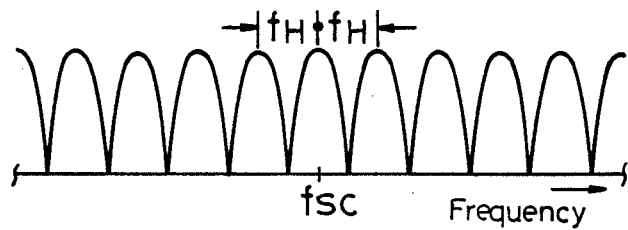

When a wide-band luminance signal Y having a frequency spectrum extending up to the frequency $f_W$, for example, 5.0 MHz, which is substantially higher than the color subcarrier frequency $f_{sc}$ as shown on FIG. 10A, is supplied to the input terminal 26, the bandpass filter 34 separates therefrom or passes only the component of such luminance signal having the frequency band of the carrier chrominance signal C (FIG. 10B) and which, for example, extends ±0.5 MHz about the color subcarrier frequency $f_{sc}$. Contrary to the addition-type comb filter 37 described with reference to FIG. 5D, the subtraction-type comb filter 37S has passbands at the frequencies $f_{sc} \pm n.f_H$, while attenuation is provided at each of the frequencies $f_{sc} \pm (2n-1).f_H/2$, wherein n is an integer. When the comb-filter 37S with the foregoing characteristic illustrated in FIG. 10C is supplied with the component of the luminance signal passing through the band-pass filter 34 and having the frequency band of the chrominance signal C shown on FIG. 10B, the output from the attenuator 40 has a comb-shaped spectrum similar to that shown in FIG. 10C in which the frequency axis is expanded for the purposes of illustration. Furthermore, the output from the attenuator 40 has its envelope limited to the frequency band indicated in FIG. 10B.

Figure 10D:
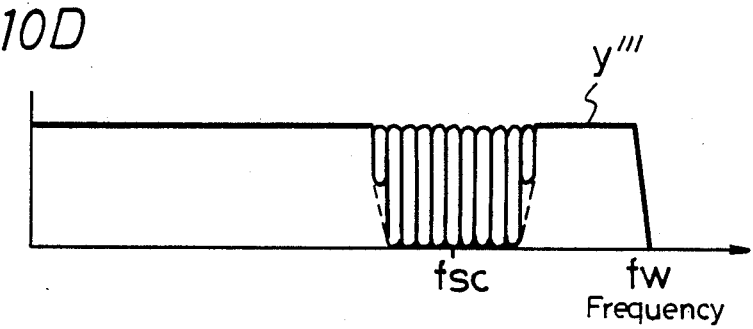

The output of the attenuator 40 having a band-limited, comb-shaped spectrum is subtracted, in subtracter 56, from the wide-band luminance signal Y as delayed by the delay line 33 so that, as shown in FIG. 10D, the output from the subtracter 56 generally presents a partly comb-shaped spectrum in which that portion of the wide-band luminance signal Y (FIG. 10A) corresponding to the frequency band of the carrier chrominance signal C (FIG. 10B) is replaced by the band-limited, comb-shaped spectrum of FIG. 10C with its polarity inverted. Finally, such output Y''' of the subtracter 56 is added to the carrier chrominance signal C in the adder 28 to provide, as the output from the latter, the composite color video signal (Y'''+C) which is free of interference and the other disadvantages of the prior art. It follows from the foregoing that the embodiment of FIG. 9 can achieve the same advantageous effects as the embodiments previously described with reference to FIGS. 4 and 6. Further, if desired, the width of the individual passbands provided by the comb-filter can be increased by replacing the comb-filter 37S with a feedback-type comb-filter.

Referring to FIG. 11, it will be seen that, in another embodiment of this invention using the comb-filter 37S of the subtraction type, but which is otherwise similar to the embodiment of FIG. 6, the wide-band luminance signal Y applied to the input terminal 26 is supplied therefrom to the band-eliminating filter or trap 41 and to one input of the subtracter 42 which receives the output of the trap 41 at its other input. Thus, the subtracter 42 subtracts the output of the trap 41 from the wide-band luminance signal Y. Once again, the central frequency of the trap 41 is selected to be equal to the color subcarrier frequency $f_{sc}$ and the output of the trap 41 is also directly supplied to one input of the subtracter 56. The output of the subtracter 42 is supplied through the comb-filter 37S and the attenuator 40 to the other input of the subtracter 56 and the output of the subtracter 56 is applied to the adder 28 for mixing in the latter with the chrominance signal C, thereby to provide, at the output terminal 29, the resulting composite color video signal.

In the operation of the embodiment of the invention shown on FIG. 11, the component of the wide-band luminance signal Y applied to the terminal 26 which is situated around the color subcarrier frequency $f_{sc}$ is attenuated or eliminated by the trap 41 so that the output from the latter presents the spectrum shown on FIG. 12A in which there is a V-shaped drop-out at the portion near the color subcarrier frequency. Such output from the trap 41 is subtracted from the wide band luminance signal Y in the subtracter 42 so that the output of the latter presents an inverted V-shaped spectrum (not shown) centered at the color subcarrier frequency. Such output from the subtracter 42 is supplied to the comb-filter 37S which has the frequency characteristic indicated by FIG. 10C, whereby the output from the attenuator 40 has a band-limited, comb-shaped spectrum with an inverted V-shaped envelope (not shown). That output from the attenuator 40 is supplied to the subtracter 56 in which it is subtracted from the output of the trap 41 having the spectrum shown on FIG. 12A. As a result of the foregoing, the output from the subtracter 56 has the partly, comb-shaped spectrum shown on FIG. 12B which is similar to that shown on FIG. 7B, and in which the dropped-out portion of the spectrum shown in FIG. 12A is supplemented, or replaced by the band-limited, comb-shaped spectrum of the output from attenuator 40, but with its polarity inverted.

Once again, the embodiment described with reference to FIG. 11 can achieve all of the advantageous results mentioned with reference to the earlier described embodiments. As in the case of the embodiment shown on FIG. 9, the comb-filter 37S in FIG. 11 can be replaced by a comb-filter of the feedback type.

It will be appreciated that, in all of the embodiments of the invention so far described, the transmission path for the wide-band luminance signal has interposed therein a trap or similar arrangement for removing from the spectrum of the wide-band luminance signal the frequency band corresponding to that of the chrominance signal, and also a comb-filter through which there is obtained a band-limited, comb-shaped spectrum rid of any of the chrominance signal that may have been mixed with the wide-band luminance signal, as reproduced, so that such band-limited, comb-shaped spectrum can replace or supplement the dropped-out portion of the wide-band luminance signal. Thus, interference between the wide-band luminance signal and the chrominance signal, for example, when added to each other in a composite color video signal, can be prevented without deteriorating or substantially losing any of the frequency band of the luminance signal, thereby substantially improving the quality of the reproduced picture. Moreover, since the luminance signal can be separately derived at the S output terminal arrangement 30 from a point in its transmission path in advance of the filter circuit 31, 31A, 31B or 31C, and the carrier chrominance signal can be separately derived at the S output terminal arrangement 30 from a point in advance of the adder 28, such separately derived wide-band luminance signal and chrominance signal can be transmitted, for example, to a monitor receiver adapted to employ the same, without distortion of such signals through the processing thereof.

The application of still another embodiment of the present invention to a video tape recorder (VTR) 10' of the type described above with reference to FIG. 1 will now be described with reference to FIG. 13. In the illustrated VTR 10', the reproduced luminance signal Y from the luminance signal processing circuit 14 is supplied to a filter circuit 31 corresponding to the similarly numbered filter circuit described above with reference to FIG. 4, and the output luminance signal Y' from such filter circuit 31 is supplied to a fixed contact W of a change-over switch 60 which has its movable contact M connected to the adder 28. The reproduced luminance signal Y from the luminance signal processing circuit 14 is also supplied to a fixed contact N of the change-over switch 60 through a trap circuit 18 which corresponds to the similarly numbered trap circuit on FIG. 1, and which is adapted to remove from the reproduced luminance signal Y a noise component near the carrier frequency $f_{sc}$ of the reproduced carrier chrominance signal C.

Figure 1:
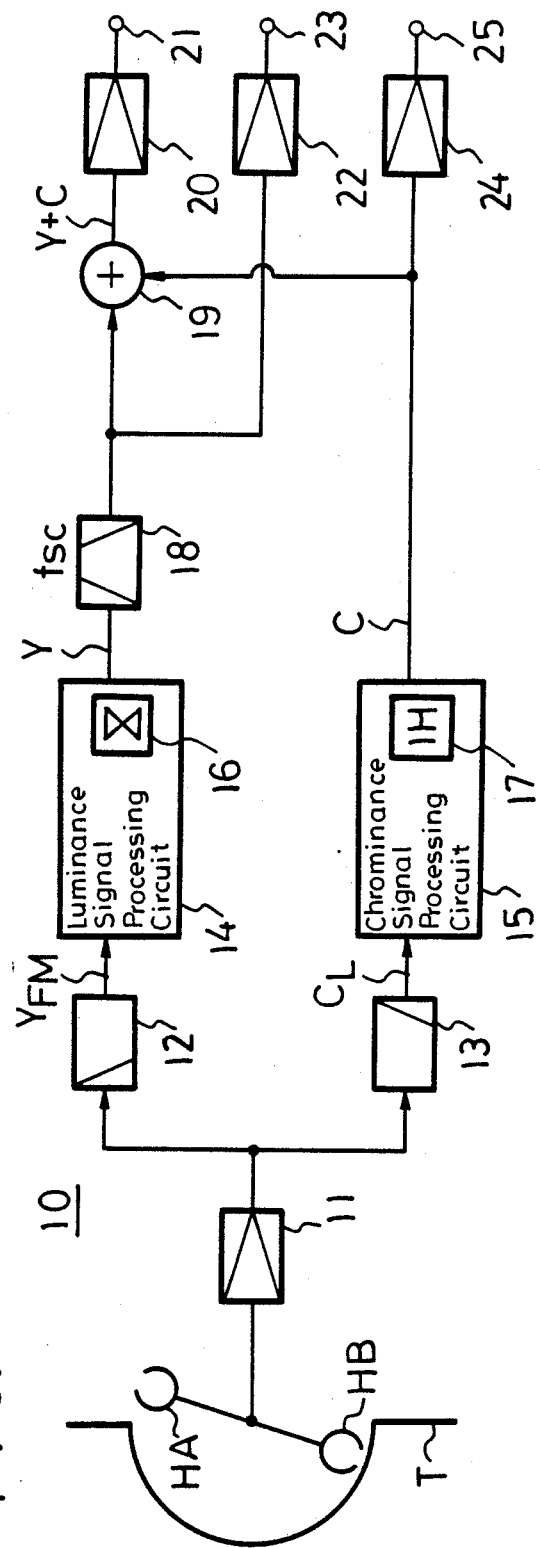
FIG. 1 is a block diagram of a reproducing system of a video tape recorder according to the prior art.
Figure 2:
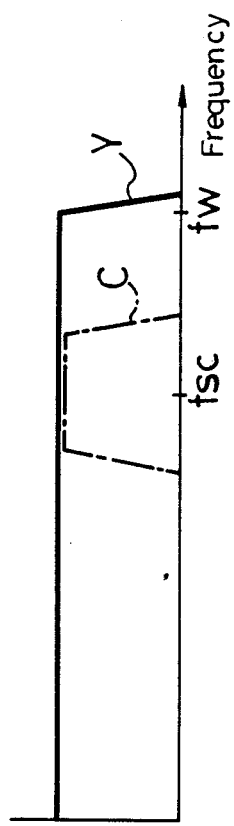
FIG. 2 is a diagrammatic view illustrating the frequency spectrum of a conventional composite color video signal that may be used in the VTR of FIG. 1.

As in the VTR of FIG. 1, in the VTR 10', the reproduced luminance signal Y from the processing circuit 14 is also supplied directly through the amplifier 22 to the output terminal 23 and the carrier chrominance signal C is also supplied from its processing circuit 15 through the amplifier 24 to the output terminal 25. Thus, the terminals 23 and 25 correspond to the S output terminal arrangement 30 of FIG. 4. Further, the reproduced luminance signal Y is applied to a line correlation detector 61 which detects whether or not the luminance signal has a line correlation component and provides a corresponding detection output to a first input of an OR gate 62 which has a second input connected to a terminal 63 which receives a reproduction mode control signal $S_m$. The output of the OR gate 62 is connected to the switch 60 for operating the latter, with the movable contact M being disposed in the position illustrated on FIG. 13, that is, in engagement with the fixed contact N, whenever the output of the OR gate 62 is at a high or "1" level, and the movable contact M of the switch 60 is changed-over to engage the fixed contact W whenever the output of the OR gate 62 is at a low or "0" level. The mode control signal $S_m$ applied to the terminal 63 is at the high or "1" level whenever the luminance signal to be reproduced is of the standard band width, for example, as shown on FIG. 2, so that the switch 60 is then disposed in the condition shown on FIG. 13. On the other hand, when a wide-band luminance signal is to be reproduced, the mode control signal $S_m$ applied to the terminal 63 has a low or "0" level. The detection output of the line correlation detector 61 is at a low level or "0" when the luminance signal is detected to have a line correlation component, whereas the output of detector 61 goes to a high or "1" level when it is detected that the reproduced luminance signal contains a non-correlation component of a carrier chrominance signal.

The VTR of FIG. 13 operates as follows:

When a luminance signal of standard or narrow bandwidth (FIG. 2) is being reproduced, the mode control signal applied to the terminal 63 is at a high level or "1" and is supplied through OR circuit 62 to the switch 60 for maintaining the latter in the illustrated condition. Thus, the reproduced luminance signal Y is passed through the trap circuit 18 and switch 60 to the adder 28. The trap circuit 18 functions to remove from the luminance signal Y of the standard band-width a noise component situated near the color subcarrier frequency $f_{sc}$. With the switch 60 positioned as shown, the luminance signal of standard band-width, and from which the noise component has been removed by the trap circuit 18, is mixed with the carrier chrominance signal C in the adder 28 so as to provide the composite chrominance signal (Y+C) at the output terminal 21.

When a wide-band luminance signal (FIG. 3) is being reproduced and such luminance signal has a line correlation component, the mode control signal $S_m$ applied to the terminal 63 is at a low level or "0" and the detection output from the line correlation detector 61 is similarly at a low level or "0". Therefore, the output from the OR gate 62 is low and, as a result thereof, the switch 60 is changed-over to engage its movable contact M with the fixed contact W. In such condition of the switch 60, the wide-band luminance signal Y (FIG. 3) is acted upon in filter circuit 31 in the manner described above with reference to FIG. 4 and the resulting luminance signal Y' is passed through switch 60 to the respective input of adder 28 for mixing or adding with the carrier chrominance signal C so as to provide the composite color video signal (Y'+C) at output terminal 21. By reason of the described action of the filter circuit 31, it is possible to avoid the zero-beat interference, cross-color interference or the like between the chrominance signal C and the portion of the luminance signal which has the band width of the chrominance signal.

Figure 13:
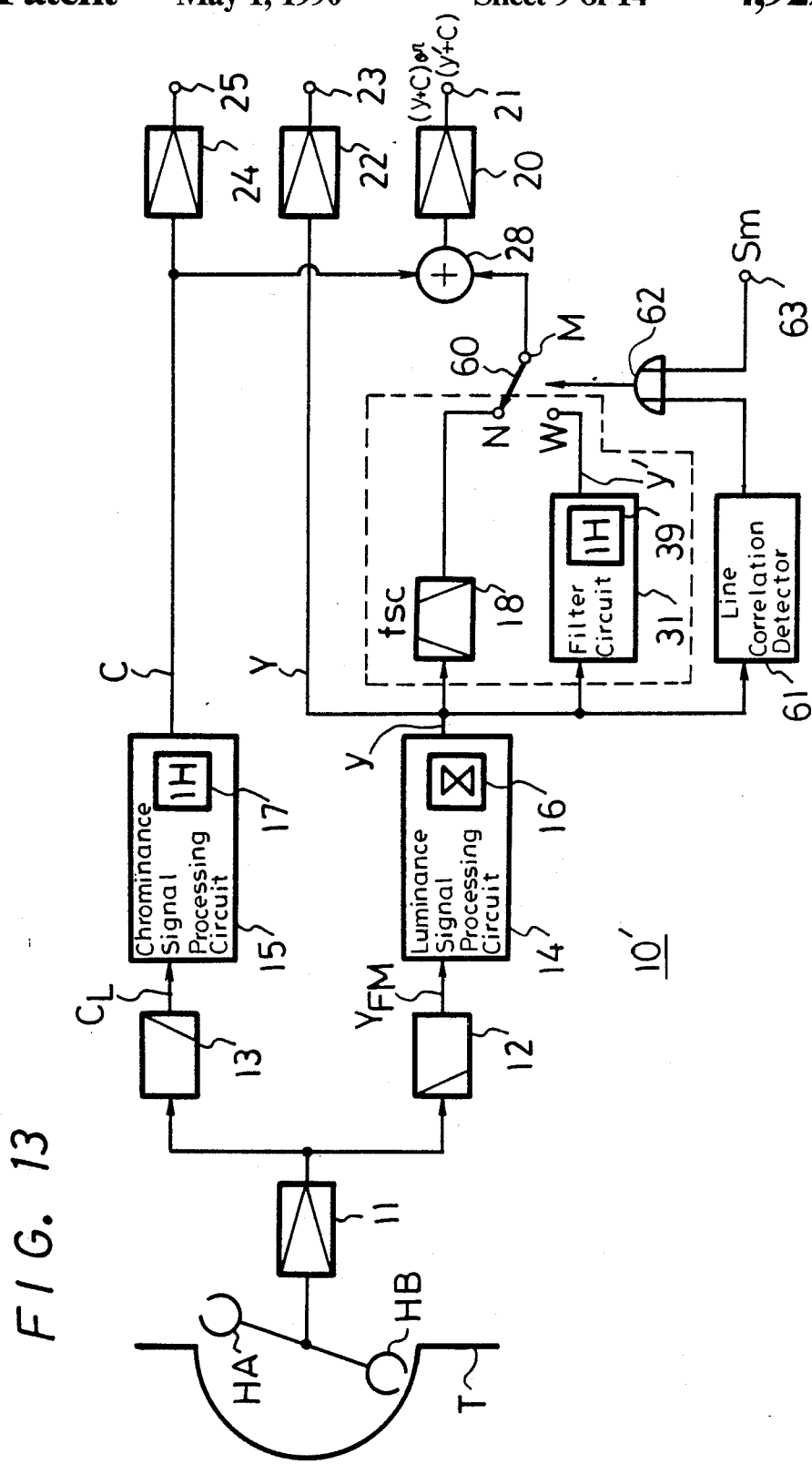
FIG. 13 is a block diagram of a reproducing system of a video tape recorder according to still another embodiment of the present invention.
Figure 14:
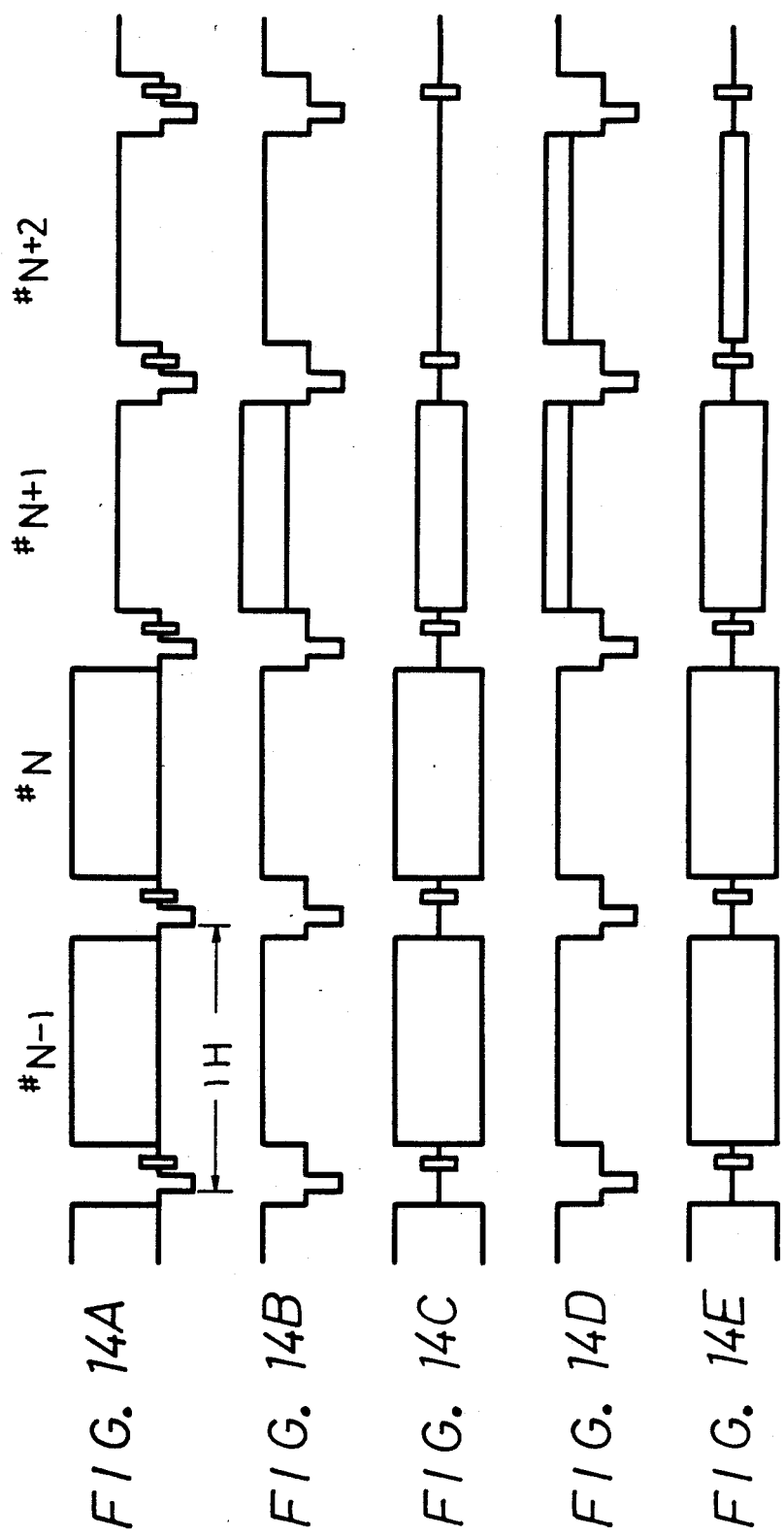
FIGS. 14A–14E are timing charts to which reference will be made in explaining the operation of the embodiment of the present invention illustrated in FIG. 13.

Even when a wide-band luminance signal is being reproduced so that the mode control signal $S_m$ applied to the terminal 63 is at a low or "0" level, if the reproduced luminance signal supplied from the luminance signal processing circuit 14 to the line correlation detector 61 contains a non-correlation component $C_{MS}$ of a carrier chrominance signal, as in FIG. 14B at the N+1 line, the detection output from the detector 61 goes to a high or "1" level at the N+1 and N+2 lines so that the switch 60 is placed in the illustrated condition for such lines. Thus, the remaining non-correlation component is removed by the trap circuit 18 from the luminance signal fed through the switch 60 to the adder 28 for avoiding deterioration of the reproduced picture by the zero-beat interference. Moreover, when a wide-band luminance signal is being reproduced, but the switch 60 is maintained in the position illustrated on FIG. 13 in response to the detection of a non-correlation component, the high band component of the wide-band luminance signal is not delayed by the delay line 39 included in the filter circuit 31 so that displacement of the reproduced picture of high definition in its vertical direction due to the non-correlation component can be reduced.

Although the VTR shown in FIG. 13 has been specifically described as employing the filter circuit 31 of FIG. 4, it will be appreciated that other filter circuits embodying the present invention, and particularly that described above with reference to FIG. 6, can be similarly employed in the VTR of FIG. 13.

Figure 15:
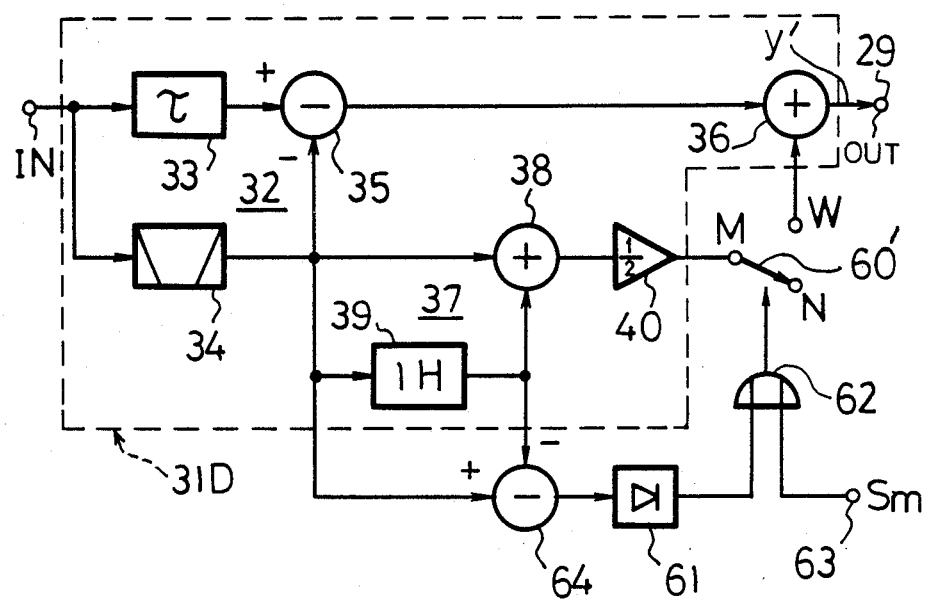
FIG. 15 is a block diagram showing a main portion of still another embodiment of the present invention.

Referring now to FIG. 15, it will be seen that, in accordance with still another embodiment of this invention, a filter circuit 31D is there illustrated to be generally similar to the filter circuit 31 of FIG. 4 and to have its several elements identified by the same reference numerals. However, in the filter circuit 31D, a switch 60' is interposed in the connection between the attenuator 40 and the adder 36. In this case, the movable contact M of the switch 60' is connected to the output of the attenuator 40 and the fixed contact W is connected to an input of the adder 36, while the fixed contact N of the switch 60' is an open or disconnected contact.

As in the arrangement described with reference to FIG. 13, a mode control signal $S_m$ is applied to a terminal 63 connected to one input of an OR gate 62 which, at its other input, receives the detection output of the line correlation detector 61, and the output of the OR gate 62 is employed for operating or controlling the switch 60'. In the arrangement of FIG. 15, the output of the band pass filter 34 included in the trap circuit 32 is applied to a subtracter 64 as well as to the input of the delay line 39 in comb-filter 37. Further, the output of the delay line 39 is applied to another input of the subtracter 64 which has its output connected to the detector 61. As in the case of the embodiment described with reference to FIG. 13, in the embodiment of FIG. 15, the mode control signal Sm has a high level when a standard band luminance signal is to be reproduced, and such high level signal, when passed through the OR gate 62, causes switch 60' to assume the position shown on FIG. 15. Conversely, when a wide-band luminance signal is to be reproduced, the level of the signal $S_m$ is low and, in response to such low level at the output of the OR gate 62, the switch 60' is changed-over to engage its fixed contact W. Moreover, the output of line-correlation detector 61 is low when line correlation is detected and high in response to the detection of non-correlation or the absence of line correlation.

In the operation of the arrangement shown on FIG. 15, if the mode control signal $S_m$ is high for indicating reproduction of a standard-band luminance signal, or the output of detector 61 is large for indicating non-correlation, the resulting high output from OR circuit 62 maintains switch 60' in the illustrated condition so that the attenuator 40 of the filter circuit 41D is disconnected from the adder 36. In that case, only the output from the trap circuit 32 constituted by the delay line 33, the band pass filter 34 and the subtracter 35 is fed through the adder 36 to the output terminal 29, and the trap circuit 32 thereby performs the function of the trap circuit 18 in FIG. 13 which is omitted from the embodiment of FIG. 15. Further, in the embodiment of FIG. 15, the subtracter 64 subtracts the signal at the output of the 1H delay line 39 from the signal at the input of such delay line, and the difference or output from the subtracter 64 is the basis for the detection by the detector 61 of the existence or absence of the line correlation component. When there is no line correlation component so that the output from the subtracter 64 is large, the corresponding high output from the detector 61 maintains the switch 60' in the illustrated or open state so that once again only the output of the subtracter 35, that is, of the trap circuit 32, is supplied through the adder 36 to the output terminal 29.

On the other hand, when the reproduced luminance signal applied to the input of the filter circuit 31D has a line correlation component and the output from the subtracter 64, and hence from the detector 61, is thereby made low, or when a wide-band luminance signal is being reproduced so that the mode control signal $S_m$ is at a low level, the movable contact M of the switch 60' is changed-over to engage its fixed contact W and, as a result thereof, the filter circuit 31D is made to be equivalent to the filter circuit 31 previously described with reference to FIG. 4 and produces the same functional advantages.

Figure 16:
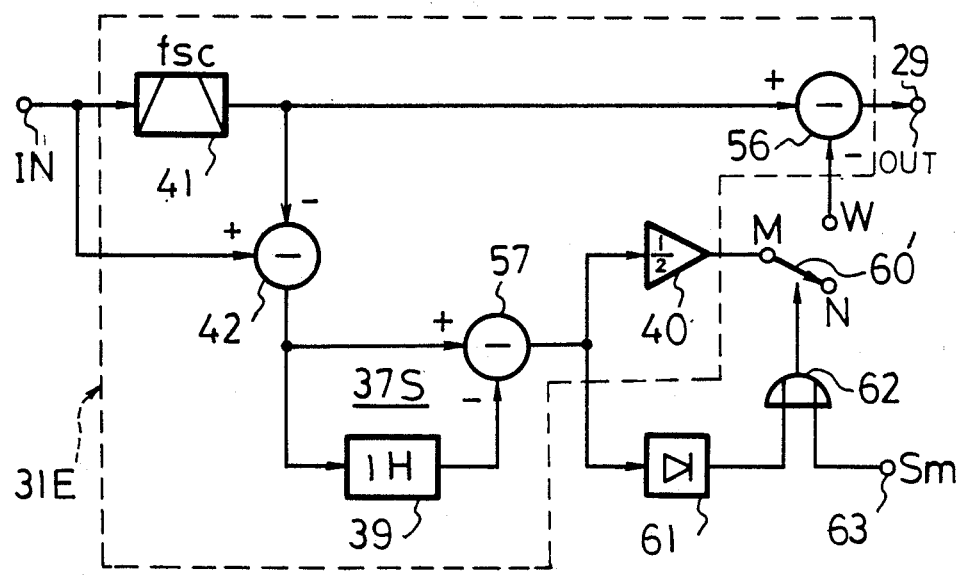
FIG. 16 is a block diagram similar to that of FIG. 15, but showing still another embodiment of the present invention.

Referring now to FIG. 16, it will be seen that the embodiment of the invention there illustrated is generally similar to that described above with reference to FIG. 15, but employs a filter circuit 31E which, when switch 60' is changed-over to engage its contact W and thereby connect the output of the attenuator 40 with an input of the subtracter 56, duplicates the arrangement of the filter circuit 31C previously described with reference to FIG. 11. More specifically, in the embodiment of FIG. 16, the output of the subtracter 57 in the comb filter 37S of the subtraction type is connected to the line correlation detector 61 as well as to the attenuator 40. In the operation of the arrangement shown on FIG. 16, when there is no line correlation, the output from the subtracter 57, that is, the output of the comb-filter 37S is large and, in response thereto the detector 61 provides a high output through OR gate 62 for maintaining switch 60' in the illustrated position. Similarly, when the reproduced luminance signal has a standard band width so that the mode control signal $S_m$ is high, the switch 60' is maintained in its illustrated state. In such condition of the switch 60', only the output from the trap circuit 41 is fed through the subtracter 56 to the output terminal 29. Thus, once again, the trap 18 used in the arrangement of FIG. 13 for removing the noise component can be omitted from the embodiment of FIG. 16.

On the other hand, when the reproduced luminance signal supplied to the input of the filter circuit 31E has line correlation so that the output from the subtracter 57 is small and, correspondingly, the output from the detector 61 is low, or when the mode control circuit $S_m$ is low for indicating that a wide-band luminance signal is being reproduced, the correspondingly low output from the OR gate 62 causes change-over of the switch 60' to engage its fixed contact W with the result that the output of attenuator 40 is applied through switch 60' to subtracter 56 and the filter circuit 31E becomes fully the equivalent of the filter circuit 31C previously described with reference to FIG. 11. Therefore, the circuit arrangement of FIG. 16 is capable of achieving the functional advantages of the embodiments described with reference to FIGS. 13 and 15, but with a relatively simplified circuit arrangement.

Referring now to FIG. 17, it will be seen that, in a filter circuit 31F embodying this invention, and which can be used in place of the trap circuit 18 and the filter circuit 31 in the VTR 10' of FIG. 13, the reproduced luminance signal Y, for example, from the luminance signal processing circuit 14, is supplied to both the trap circuit 32 and the comb filter 37 which may be configured similarly to the correspondingly numbered components on FIG. 4. In the filter circuit 31F, the outputs of the trap circuit 32 and the comb filter 37 are mixed together with a variable mixing ratio, for example, by means of a potentiometer 70 including a resistance element having its opposite ends 70a and 70b connected to the outputs of the trap circuit 32 and the comb filter 37, respectively, and a slide contact or movable tap 70c engaging the resistance element for determining the mixing ratio of the output signals from the trap circuit 32 and the comb filter 37, respectively, available at the slide contact 70c. The resulting luminance signal is applied from slide contact 70c to one input of the adder 28 which, at its other input, receives the chrominance signal C for providing a composite color video signal (Y'+C) at the output terminal 29.

The position of the slide contact 70c, and hence mixing ratio of the outputs from the trap circuit 32 and the comb filter 37, is determined by a control signal derived at the output of an adder 71 and which is suitably operative to effect displacement of the slide contact 70c along the resistance element of the potentiometer 70. More specifically, the slide contact 70c of the potentiometer is moved toward the end 70a of the resistance element in response to an increase in the level of the control signal from the adder 71, thereby to reduce the ratio of the output of the comb filter 37 included in the mixed signal applied from the slide contact 70c to adder 28. Conversely, in response to a reduction in the level of the control signal from the output of the adder 71, the slide contact 70c is moved toward the end 70b of the resistance element of the potentiometer, thereby increasing the ratio of the output of the comb filter 37 in the mixed signal comprised of the outputs of the trap circuit 32 and the comb circuit 37.

The level of the control signal from the adder 71 for the potentiometer 70 is determined, in part, by a chrominance signal level detector 72 which receives the chrominance signal C, for example, from the chrominance signal processing circuit 15 in FIG. 13, and responds to the level thereof for providing a corresponding detection output to one input of the adder 71. The adder 71 further receives, at respective inputs thereof, the mode control signal $S_m$ applied to the terminal 63, and a line correlation detection signal applied to a terminal 73, for example, from the line correlation detector 61 on FIG. 13.

In operation of the embodiment of the invention shown on FIG. 17, when the level of the chrominance signal C is high, the resulting output from the chrominance level detector 72 applied to the adder 71 causes the slide contact 70c of the potentiometer 70 to be moved to the end 70a so that the filter circuit 31F substantially has the transmission characteristic of the trap circuit 32, for example, as shown on FIG. 18A. On the other hand, when the level of the carrier chrominance signal C is low, the resulting output from the chrominance level detector 72 causes movement of the slide contact 70c toward the other end 70b of the potentiometer 70 so as to provide the filter circuit 31F with the comb-filter characteristic shown on FIG. 18C. Further, when the level of the carrier chrominance signal is intermediate the high and low levels thereof, the slide contact 70c of the potentiometer is situated at an intermediate position thereof on the resistance element so as to provide a transmission characteristic intermediate the characteristics of the trap circuit 32 and the comb filter 37, for example, as shown in FIG. 18B.

Further, when the line correlation detection signal applied to the terminal 73 is large, the resulting control signal applied from adder 71 to potentiometer 70 causes movement of the slide contact 70c toward the end 70b for providing the filter circuit 31F substantially with the characteristic shown on FIG. 18C. On the other hand, when the line correlation component of the luminance signal Y is small, that is, in the case of non-correlation, the slide contact 70c of the potentiometer is moved to the end 70a of the resistance element, thereby providing the filter circuit 31F substantially with the characteristic of the trap circuit 32, as shown on FIG. 18A. Moreover, when the line correlation component of the luminance signal has an intermediate value, the slide contact 70c of the potentiometer is substantially centrally located so that the effective transmission characteristic of the filter circuit 31F will then be approximately that shown in FIG. 18B.

Similarly to the above, when the mode control signal $S_m$ applied to the terminal 63 is at a low level for indicating the reproducing of a wide-band luminance signal Y, the slide contact 70c of the potentiometer 70 is moved to the end 70b so that the filter circuit 31F is provided substantially with the transmission characteristic of the comb-filter 37, as shown on FIG. 18C. When the frequency band of the reproduced luminance signal is normal, for example, as in FIG. 2, the resulting high level of the mode control signal $S_m$ applied to terminal 63 is effective, at the output of adder 71, to move the slide contact 70c toward the end 70a of the potentiometer 70 so that the filter circuit 31F then has substantially the transmission characteristic of the trap circuit 32, for example, as shown on FIG. 18A, for eliminating from the luminance signal noise near to the chrominance carrier frequency $f_{sc}$. Alternatively, the level of the mode control signal $S_m$ applied to the terminal 63 for indicating the reproducing of a luminance signal with the normal or standard band width, may be selected to dispose the slide contact 70c at a central position of the potentiometer 70.

Figure 19:
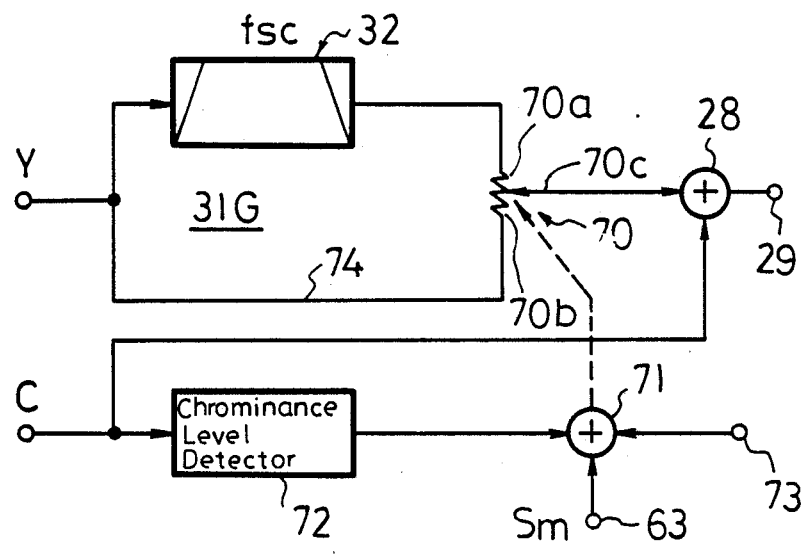
FIG. 19 is a block diagram similar to that of FIG. 17, but showing yet another embodiment of the present invention.

Reference will now be made to FIG. 19, which illustrates a filter circuit 31G that is a modification of the filter circuit 31F described with reference to FIG. 17, and which has its corresponding parts identified by the same reference numerals. More specifically, it will be seen that, in the filter circuit 31G, the comb filter 37 of the filter circuit 31F is omitted and it is replaced by a simple by-pass line 74.

Figure 20A:
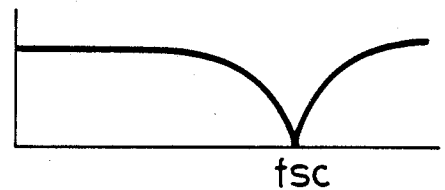
FIGS. 20A–20C are diagrams showing respective frequency spectra, and to which reference will be made in explaining the operation of the embodiment of the invention shown in FIG. 19.
Figure 20B:
Figure 20C:
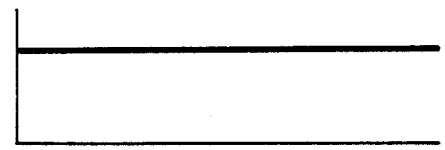

When the level of the carrier chrominance signal is high, as detected by the detector 72, the resulting control signal from adder 71 effects movement of the slide contact 70c of the potentiometer 70 to the end 70a, thereby providing the filter circuit 31G with the transmission characteristic of the trap circuit 32, as shown in FIG. 20A. On the other hand, when the level of the carrier chrominance signal C is low, the slide contact 70c is moved to the other end 70b of the potentiometer 70 so that the reproduced luminance signal is transmitted to the adder 28 primarily through the by-pass line 74 in which case the filter circuit 31G has a flat transmission characteristic, as shown in FIG. 20C. When the chrominance signal has an intermediate level, the slide contact 70c of the potentiometer 70 is disposed at a central or intermediate position thereof, with the result that the filter circuit 31G has a transmission characteristic intermediate those shown on FIGS. 20A and 20C, respectively, for example, a transmission characteristic as shown on FIG. 20B.

When the line correlation detection output applied to the terminal 73 in FIG. 19 indicates that the luminance signal Y has a large line correlation component, the slide contact 70c is moved to the end 70b of the potentiometer so that the luminance signal is, for the most part, transmitted through the by-pass line 74 and the filter circuit 31G has the flat transmission characteristic shown on FIG. 20C. When there is non-correlation of the luminance signal Y, the slide contact 70c is moved to the end 70a of the potentiometer 70 to provide the filter circuit 31G substantially with the transmission characteristic of the trap circuit 32, as represented on FIG. 20A. When the luminance signal Y has an intermediate line correlation component, the potentiometer 70 is similarly adjusted so as to provide the filter circuit 31G with the intermediate transmission characteristic represented by FIG. 20B.

Figure 3:
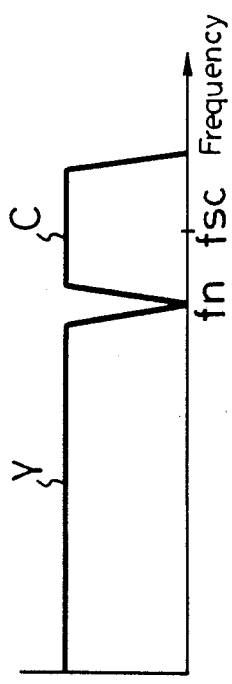
FIG. 3 is a diagrammatic view showing the frequency spectrum of a wide band luminance signal.

It will be further understood that, when the reproduced luminance signal Y has a wide band, as in FIG. 3, the mode control signal $S_m$ applied to terminal 63 causes movement of the slide contact 70c to the end 70b of the potentiometer 70 with the result that the flat transmission characteristic of FIG. 20C is provided. When the luminance signal Y has a normal or standard frequency band, the slide contact 70c is moved to the end 70a of the potentiometer thereby providing the filter circuit 31G with the transmission characteristic of the trap circuit 32 shown in FIG. 20A.

Figure 21:
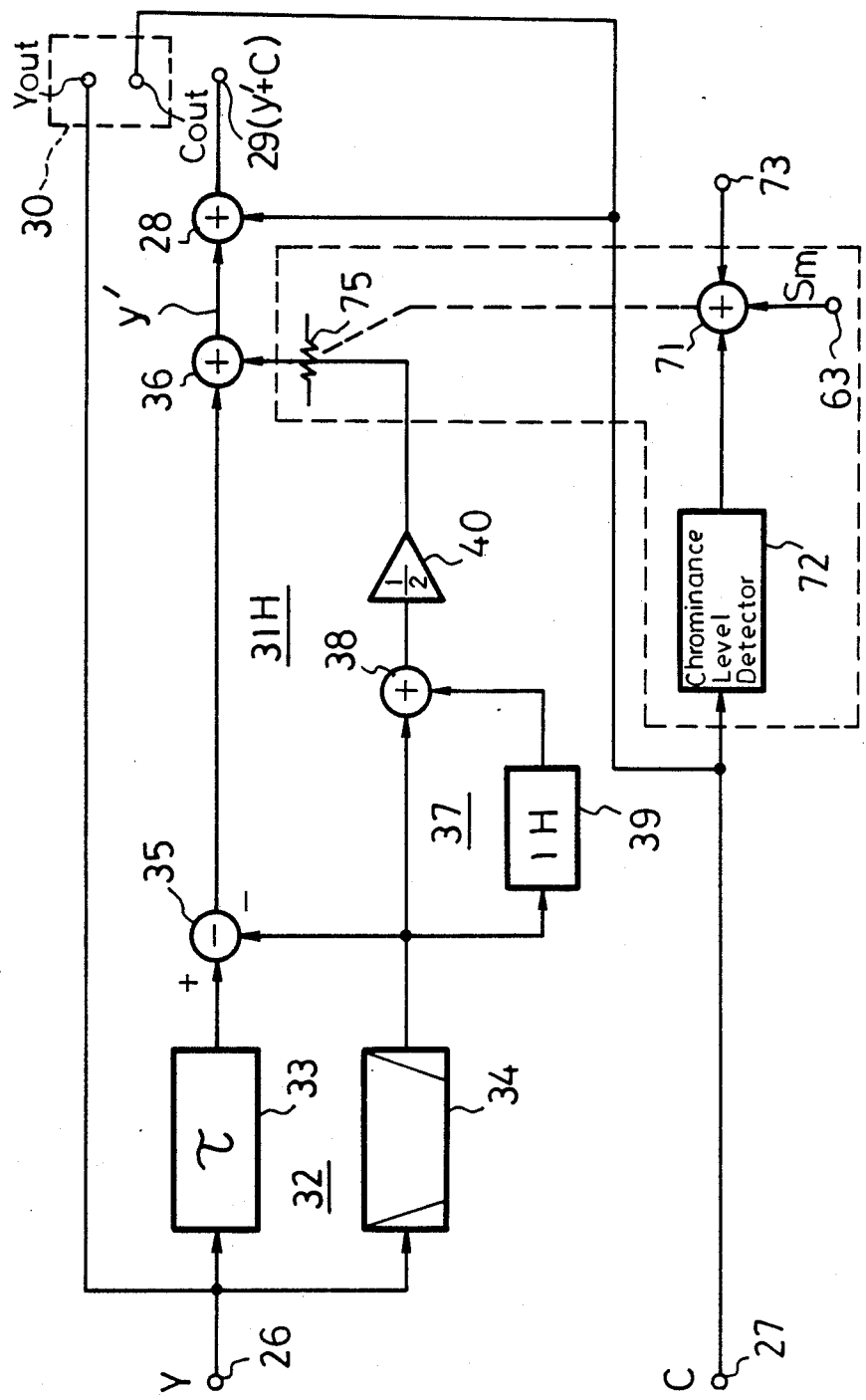
FIG. 21 is a block diagram showing a main portion of the reproducing system of a video tape recorder in accordance with yet another embodiment of the present invention.

Referring now to FIG. 21, it will be seen that, in a filter circuit 31H according to a modification of the arrangement described above with reference to FIG. 4, the corresponding parts are identified by the same reference numerals. More specifically, the filter circuit 31H of FIG. 21 differs from the filter circuit 31 of FIG. 4 in that a variable attenuator 75 is interposed in the line between the fixed attenuator 40 and the corresponding input of the adder 36. Such variable attenuator 75 is controlled by a control signal from the output of the adder 71 which, as in the embodiments described above with reference to FIGS. 17 and 19, is determined by inputs to the adder 71 corresponding to the detected chrominance signal level, the mode control signal $S_m$ depending upon whether the reproduced luminance signal has a wide band or a normal band, and the detected line correlation component of the luminance signal applied to the terminal 73.

As earlier noted with respect to FIG. 4, the output from the band-pass filter 34 has the band-width shown on FIG. 5B, and the output from the subtractor 35 has the frequency spectrum with a dropped-out portion, as shown in FIG. 5C. Further, the output from the band-pass filter 34 is filtered by the comb-filter 37 to present the band-limited, comb-filter spectrum shown in FIG. 5D expanded in the frequency direction. When the variable attenuator 75 is adjusted to provide zero attenuation thereby so that the output from the attenuator 40 is, in effect, directly added to the output from the subtracter 35 at the adder 36, such addition at the adder 36 is effected in a fashion so that the band-limited, comb-filter spectrum (FIG. 5D) of the attenuator 40 compensates for the frequency spectrum at the output of the subtracter 35, that is, the frequency spectrum with a portion dropped out, thereby to provide an overall characteristic corresponding to that shown on FIG. 5E.

On the other hand, when a large degree of attenuation is provided by the variable attenuator 75, the output from the attenuator 40 is substantially excluded from the adder 36 with the result that the output from the adder 36 is substantially the same as the output of the subtracter 35 which is the band-eliminated signal of FIG. 5C. In other words, when the variable attenuator 75 is adjusted to provide a large attenuation, the filter circuit 31H has a transmission characteristic substantially corresponding to that of the trap circuit 32. When the variable attenuator 75 is adjusted to provide an intermediate degree of attenuation, the output of the attenuator 40 is reduced in level for application to the adder 36 and mixing in the latter with the output from the subtracter 35 of the trap circuit 32. Accordingly, in the latter case, the band-limited, comb-shaped spectrum (FIG. 5E) partly compensates for the dropped-out portion of the frequency spectrum (FIG. 5C) to provide an overall transmission characteristic.

It will be appreciated from the above that, in accordance with this invention, the filter circuit interposed in the transmission path for the reproduced luminance signal may have a band-eliminating characteristic, for example, as shown on FIG. 5C, for eliminating a band width of the luminance signal which corresponds to the band width of the carrier chrominance signal, and/or a comb-filter characteristic which substantially attenuates the luminance signal at each of the frequencies $f_{SC} \pm n.f_H$ and which passes the luminance signal at each of the frequencies $f_{SC} \pm (2n-1).f_H/2$. Further, the filter circuit may be arranged so as to permit changing of its transmission characteristic, whereby the band-eliminating characteristic of FIG. 5C can be presented when the reproduced luminance signal has a narrow or standard band width, or when the reproduced luminance signal has no line correlation component, whereas the comb-filter characteristic is employed to supplement the band-eliminating characteristic, as in FIG. 5E, when a wide-band luminance signal is being reproduced. Thus, in accordance with this invention, noise appearing in the reproduced luminance signal near the color subcarrier frequency $f_{sc}$ and "displacement" of the high definition picture in its vertical direction can be avoided, and interference can be prevented as a result of a vertical non-correlation component of the color picture.

Although preferred illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A video signal reproducing apparatus for obtaining a composite color video signal from a reproduced carrier chrominance signal and a reproduced luminance signal of a wide frequency band containing at least a band of said carrier chrominance signal comprising:

means defining a transmission path for said reproduced luminance signal;

adding means for adding an output of said transmission path to said chrominance signal so as to provide a composite color video signal as a first output signal;

filter means interposed in said transmission path for preventing interference between said chrominance signal and the portion of said frequency band of the reproduced luminance signal corresponding to said band of the carrier chrominance signal when said output of the transmission path is added to said chrominance signal;

means for separately deriving said reproduced luminance signal from a point in said transmission path in advance of said filter means as a second output signal; and means for separately deriving said carrier chrominance signal in advance of said adding of the chrominance signal to said output of the transmission path as a third output signal.

2. A video signal reproducing apparatus according to claim 1; wherein said filter means includes a trap circuit for eliminating a predetermined band of said reproduced luminance signal which is centered about a color sub-carrier frequency of said carrier chrominance signal.

3. A video signal reproducing apparatus according to claim 2; wherein said filter means further includes comb-filter means having a pass band characteristic with peaks at integral multiples of a horizontal frequency of the video signal.

4. A video signal reproducing apparatus according to claim 1; wherein said filter means includes comb-filter means having a pass band characteristic with peaks at integral multiples of a horizontal frequency of the video signal.

5. A video signal reproducing apparatus for obtaining a composite color video signal from a reproduced carrier chrominance signal and a reproduced luminance signal of a frequency band containing a band of said carrier chrominance signal comprising:

means defining a transmission path for said reproduced luminance signal;

adding means for adding an output of said transmission path to said chrominance signal so as to provide a composite color video signal;

filter means interposed in said transmission path for preventing interference between said chrominance signal and the portion of said frequency band of the reproduced luminance signal corresponding to said band of the carrier chrominance signal when said output of the transmission path is added to said chrominance signal, said filter means including a trap circuit for eliminating a predetermined band of said reproduced luminance signal which is centered about a color sub-carrier frequency of said carrier chrominance signal, comb-filter means having a pass band characteristic with peaks at integral multiples of a horizontal frequency of the video signal; and means for mixing an output of said trap circuit and an output of said comb-filter means;

means for separately deriving said reproduced luminance signal from a point in said transmission path in advance of said filter means; and means for separately deriving said carrier chrominance signal in advance of said adding of the chrominance signal to said output of the transmission path.

6. A video signal reproducing apparatus according to claim 5; wherein said filter means further includes means for varying a mixing ratio of said outputs of the trap circuit and the comb-filter means, respectively, in said means for mixing, and control means for determining said mixing ratio.

7. A video signal reproducing apparatus according to claim 6; wherein said control means includes means responsive to the level of said reproduced chrominance signal.

8. A video signal reproducing apparatus according to claim 6; wherein said control means is responsive to the width of said frequency band of the reproduced luminance signal.

9. A video signal reproducing apparatus according to claim 6; wherein said control means is responsive to a line correlation component of said reproduced luminance signal.

10. A video signal reproducing apparatus according to claim 6; wherein said control means determines said mixing ratio in accordance with the level of said reproduced chrominance signal, a line correlation component of said reproduced luminance signal and the width of said frequency band of the reproduced luminance signal.

11. A video signal reproducing apparatus according to claim 10; wherein the ratio of said output of the comb-filter means relative to said output of the trap circuit is increased for decreases in said level of the reproduced chrominance signal, for increases in said line correlation component and for increases in said width of the frequency band of said reproduced luminance signal.

12. A video signal reproducing apparatus according to claim 6; wherein said means for varying the mixing ratio includes potentiometer means having a resistance element connected, at its ends, to said trap circuit and said comb-filter means, respectively, and a movable tap displaceable along said resistance element for said varying of the mixing ratio.

13. A video signal reproducing apparatus according to claim 6; wherein said means for varying said mixing ratio includes switch means having a first position in which said output of the comb-filter means is supplied therethrough to said means for mixing in a predetermined ratio to said output of the trap circuit, and a second position in which said output of the comb-filter means is disconnected from said means for mixing.

14. A video signal reproducing apparatus according to claim 13; wherein said control means disposes said switch means in said first position when said reproduced chrominance signal has a low level, when said reproduced luminance signal has a large line correlation and when said frequency band of the reproduced luminance signal is relatively wide.

15. A video signal reproducing apparatus according to claim 5; wherein said filter means further includes means for attenuating said output of the comb-filter means prior to said mixing with said output of the trap circuit.

16. A video signal reproducing apparatus according to claim 15; wherein said means for attenuating includes a variable attenuator.

17. A video signal reproducing apparatus for obtaining a composite color video signal from a reproduced carrier chrominance signal and a reproduced luminance signal of a frequency band containing a band of said carrier chrominance signal comprising:

means defining a transmission path for said reproduced luminance signal;

adding means for adding an output of said transmission path to said chrominance signal so as to provide a composite color video signal;

filter means interposed in said transmission path for preventing interference between said chrominance signal and the portion of said frequency band of the reproduced luminance signal corresponding to said band of the carrier chrominance signal when said output of the transmission path is added to said chrominance signal, said filter means including a trap circuit for eliminating a predetermined band of said reproduced luminance signal which is centered about a color sub-carrier frequency of said carrier chrominance signal;

means for separately deriving said reproduced luminance signal from a point in said transmission path in advance of said filter means; and means for separately deriving said carrier chrominance signal in advance of said adding of the chrominance signal to said output of the transmission path; and wherein said transmission path includes a by-pass around said trap circuit; and said filter means includes means for mixing an output of said trap circuit with the reproduced luminance signal transmitted through said by-pass, and means for varying a mixing ratio of said output of the trap circuit and said luminance signal transmitted through the by-pass.

18. A video signal reproducing apparatus according to claim 17; wherein said filter means further includes control means for determining said mixing ratio so as to increase the proportion of said luminance signal in said mixing ration which is transmitted through said by-pass in response to a relatively low level of said reproduced chrominance signal, a large line correlation component of said luminance signal and a wide frequency band of said luminance signal.

* * * * *